United States Patent
Ikeda (10) Patent No.: US 9,009,372 B2
(45) Date of Patent: Apr. 14, 2015

(54) PROCESSOR AND CONTROL METHOD FOR PROCESSOR

(71) Applicant: Fujitsu Limited, Kawasaki-shi, Kanagawa (JP)

(72) Inventor: Yoshiro Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 67 days.

(21) Appl. No.: 13/920,811

(22) Filed: Jun. 18, 2013

(65) Prior Publication Data

US 2014/0052923 A1 Feb. 20, 2014

(30) Foreign Application Priority Data

Aug. 16, 2012 (JP) ................... 2012-180607

(51) Int. Cl.
*G06F 12/08* (2006.01)
*G06F 15/173* (2006.01)

(52) U.S. Cl.
CPC .......... *G06F 12/084* (2013.01); *G06F 12/0813* (2013.01); *G06F 15/173* (2013.01); *G06F 12/0817* (2013.01); *Y02B 60/1225* (2013.01)

(58) Field of Classification Search
CPC ............................ G06F 12/0813; G06F 15/173
See application file for complete search history.

(56) References Cited

U.S. PATENT DOCUMENTS

| | | | | |
|---|---|---|---|---|
| 7,743,285 | B1 * | 6/2010 | Aggarwal et al. | 714/43 |
| 2004/0103218 | A1 | 5/2004 | Blumrich et al. | |
| 2005/0132163 | A1 | 6/2005 | Stockmeyer | |
| 2005/0268027 | A1 | 12/2005 | Katsuki et al. | |
| 2009/0016332 | A1 * | 1/2009 | Aoki et al. | 370/388 |
| 2012/0311266 | A1 * | 12/2012 | Takata | 711/119 |

FOREIGN PATENT DOCUMENTS

| | | |
|---|---|---|
| JP | 2004-538548 | 12/2004 |
| JP | 2005-174289 | 6/2005 |
| JP | 2005-339348 | 12/2005 |
| WO | WO-02-84509 | 10/2002 |

* cited by examiner

*Primary Examiner* — Zachary K Huson
(74) *Attorney, Agent, or Firm* — Fujitsu Patent Center (57) ABSTRACT

A processor includes a plurality of nodes arranged two dimensionally in the X-axis direction and in the Y-axis direction, and each of the nodes includes a processor core and a distributed shared cache memory. The processor also includes a first connecting unit and a second connecting unit. The first connecting unit connects adjacent nodes in the X-axis direction among the nodes, in a ring shape. The second connecting unit connects adjacent nodes in the Y-axis direction among the nodes, in a ring shape. The cache memories included in the respective nodes are divided into banks in the Y-axis direction. Coherency of the cache memories in the X-axis direction is controlled by a snoop system. The cache memories are shared by the nodes.

4 Claims, 10 Drawing Sheets

PROCESSOR AND CONTROL METHOD FOR PROCESSOR

CROSS-REFERENCE TO RELATED APPLICATION

This application is based upon and claims the benefit of priority of the prior Japanese Patent Application No. 2012-180607, filed on Aug. 16, 2012, the entire contents of which are incorporated herein by reference.

FIELD

The embodiments discussed herein are related to a processor and a control method for the processor.

BACKGROUND

In recent years, the number of processor cores (hereinafter, described as "cores") as arithmetic processing units integrated on a chip of a central processing unit (CPU) is increasing in order to improve the performance of the CPU and suppress an increase in the power consumption due to a high frequency clock. Furthermore, as a technology for connecting the cores on the same chip, a ring network and a mesh network for example are known.

Patent Document 1: Japanese Laid-open Patent Publication No. 2005-174289
Patent Document 2: Japanese National Publication of International Patent Application No. 2004-538548
Patent Document 3: Japanese Laid-open Patent Publication No. 2005-339348

However, in the related technology as described above, it is impossible to improve the performance with an increase in the number of cores.

For example, when the number of cores increases, it is desirable to increase the bisection bandwidth (Bisection Bandwidth). However, if the cores are connected in a single ring, a communication distance between the cores increases, so that the bisection bandwidth is not increased even when the number of cores increases.

Furthermore, in the mesh network in which a storage area is divided into banks, when a core accesses a storage area other than the storage area managed by itself, the core accesses a cache memory of an external core. Therefore, when the core frequently accesses the cache memory of the external core, latency is increased. Moreover, if a number of cores access storage areas other than the storage areas managed by themselves, load on the communication network between the cores increases. The increase in the latency or the load on the communication network between the cores occurs not only in the mesh network but also in any structure in which a storage area is divided into banks.

SUMMARY

According to an aspect of an embodiment, a processor includes a plurality of nodes arranged two dimensionally in the X-axis direction and in the Y-axis direction, and each of the nodes includes a processor core and a distributed shared cache memory. The processor includes a first connecting unit and a second connecting unit. The first connecting unit connects adjacent nodes in the X-axis direction among the nodes, in a ring shape. The second connecting unit connects adjacent nodes in the Y-axis direction among the nodes, in a ring shape. The cache memories included in the respective nodes are divided into banks in the Y-axis direction. Coherency of the cache memories in the X-axis direction is controlled by a snoop system. The cache memories are shared by the nodes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to accompanying drawings. The present invention is not limited by the embodiments below. The embodiments can be appropriately combined within a scope which does not cause a contradiction between processing contents.

[a] First Embodiment

Configuration of a Processor 100 according to the First Embodiment

Figure 1:
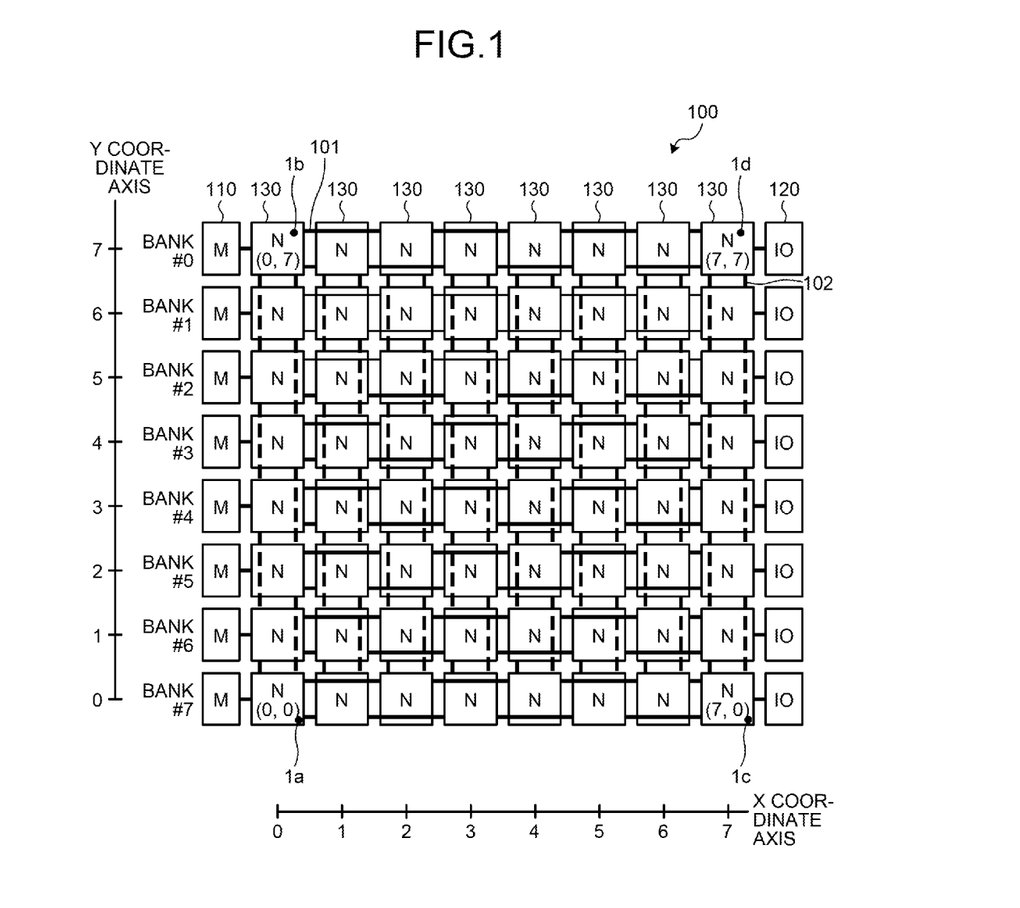
FIG. 1 is a block diagram illustrating a configuration example of a processor according to a first embodiment.

FIG. 1 is a block diagram illustrating a configuration example of the processor 100 according to a first embodiment. As illustrated in FIG. 1, the processor 100 includes a memory control device 110 (M in FIG. 1), an input/output (I/O) control device 120 (IO in FIG. 1), and a plurality of nodes 130 (N in FIG. 1) that are two-dimensionally arranged in the X-axis direction and the Y-axis direction in a tiled manner.

The memory control device 110 controls input and output of data between the nodes 130 and a main memory (not illustrated). The I/O control device 120 is an I/O connection interface, such as PCI Express (Peripheral Component Interconnect Express) or interconnect, and controls input and output of data between the nodes 130 and an input/output device (not illustrated).

Each of the nodes 130 includes a processor core (hereinafter, described as "core") serving as an arithmetic processing unit, and includes a distributed shared cache memory and a torus router (see FIG. 2). The node 130 performs arithmetic processing by using data stored in a distributed shared cache memory of the node 130 or data stored in a distributed shared cache memory of other nodes. In the following explanation, the distributed shared cache memory is described as a "cache memory".

When the nodes 130 are distinguished from one another in the explanation, the position where each of the nodes 130 is located is represented by the coordinate in the X-Y coordinate plane. For example, the node 130 indicated by 1a in FIG. 1 is located at the coordinate (0, 0), and the node 130 indicated by 1b in FIG. 1 is located at the coordinate (0, 7). Furthermore, the node 130 indicated by 1c in FIG. 1 is located at the coordinate (7, 0), and the node 130 indicated by 1d in FIG. 1 is located at the coordinate (7, 7). The configuration of the node 130 will be explained later with reference to FIG. 2.

In the processor 100 configured as above, a first connecting unit 101 connects the nodes 130 in a ring shape in the X-axis direction. For example, when the node 130 is located at a position other than either end in the X-axis direction, the first connecting unit 101 connects the node 130 and a node located at a position adjacent to the node 130 across at least one node. As an example, the first connecting unit 101 connects the node 130 located at the coordinate (3, 0) and the node 130 located at the coordinate (1, 0), and also connects the node 130 located at the coordinate (3, 0) and the node 130 located at the coordinate (5, 0).

When the node 130 is located at either end in the X-axis direction, the first connecting unit 101 connects the node 130 and a node located adjacent to the node 130. Furthermore, when the node 130 is located at either end in the X-axis direction, the first connecting unit 101 connects the node 130 and a node located adjacent to the node that is located adjacent to the node 130. As an example, the first connecting unit 101 connects the node 130 located at the coordinate (0, 0) and the node 130 located at the coordinate (1, 0), and also connects the node 130 located at the coordinate (0, 0) and the node 130 located at the coordinate (2, 0).

Moreover, when the node 130 is adjacent to a node located at either end in the X-axis direction, the first connecting unit 101 connects the node 130 and the adjacent node located at the either end. Furthermore, when the node 130 is adjacent to a node located at either end in the X-axis direction, the first connecting unit 101 connects the node 130 and a node adjacent to a node that is located adjacent to the node 130. As an example, the first connecting unit 101 connects the node 130 located at the coordinate (1, 0) and the node 130 located at the coordinate (0, 0), and also connects the node 130 located at the coordinate (1, 0) and the node 130 located at the coordinate (3, 0). In this way, the first connecting unit 101 establishes ring connections among a plurality of the nodes 130 that are arranged so as to have the same Y coordinate.

As described above, in the example illustrated in FIG. 1, the first connecting unit 101 generates eight ring networks that function independently of each other. When the eight nodes 130 are connected in the X-axis direction by the first connecting unit 101, the inter-node shortest-path hop count becomes "1" between the connected nodes. Furthermore, the inter-node longest-path hop count becomes "4" between the nodes located at adjacent positions or between the nodes located at both ends. Namely, the ring network generated by the first connecting unit 101 can reduce the longest-path hop count compared with the ring network that is generated by connecting adjacent nodes. The first connecting unit 101 is, for example, a bus such as a so-called "snoop bus".

A second connecting unit 102 connects the nodes 130 in a ring shape in the Y-axis direction. For example, when the node 130 is located at a position other than either end in the Y-axis direction, the second connecting unit 102 connects the node 130 and a node located at a position adjacent to the node 130 across at least one node. As an example, the second connecting unit 102 connects the node 130 located at the coordinate (0, 3) and the node 130 located at the coordinate (0, 1), and also connects the node 130 located at the coordinate (0, 3) and the node 130 located at the coordinate (0, 5).

When the node 130 is located at either end in the Y-axis direction, the second connecting unit 102 connects the node 130 and a node located adjacent to the node 130. Furthermore, when the node 130 is located at either end in the Y-axis direction, the second connecting unit 102 connects the node 130 and a node located adjacent to the node that is located adjacent to the node 130. As an example, the second connecting unit 102 connects the node 130 located at the coordinate (0, 0) and the node 130 located at the coordinate (0, 1), and also connects the node 130 located at the coordinate (0, 0) and the node 130 located at the coordinate (0, 2).

Moreover, when the node 130 is adjacent to a node located at either end in the Y-axis direction, the second connecting unit 102 connects the node 130 and the adjacent node located at the either end. Furthermore, when the node 130 is adjacent to a node located at either end in the Y-axis direction, the second connecting unit 102 connects the node 130 and a node adjacent to a node that is located adjacent to the node 130. As an example, the second connecting unit 102 connects the node 130 located at the coordinate (0, 1) and the node 130 located at the coordinate (0, 0), and also connects the node 130 located at the coordinate (0, 1) and the node 130 located at the coordinate (0, 3). In this way, the second connecting unit 102 establishes ring connections among a plurality of the nodes 130 that are arranged so as to have the same X coordinate.

As described above, in the example illustrated in FIG. 1, the second connecting unit 102 generates eight ring networks that function independently of each other. When the eight nodes 130 are connected in the Y-axis direction by the second connecting unit 102, the inter-node shortest-path hop count becomes "1" between the connected nodes. Furthermore, the inter-node longest-path hop count becomes "4" between the nodes located at adjacent positions or between the nodes located at both ends. Namely, the ring network generated by the second connecting unit 102 can reduce the longest-path hop count compared with the ring network that is generated by connecting adjacent nodes. The second connecting unit 102 is, for example, a bus such as a so-called "cache data bus".

In the processor 100, both of the X-axis direction and the Y-axis direction are connected by the ring networks, and a torus router performs routing between the ring networks. In this way, in the processor 100, the nodes 130 perform packet routing among a plurality of the ring networks, so that a torus network is formed.

Incidentally, the cache memories in the nodes 130 located at the same X coordinate are divided into, for example, eight banks of a bank #0 to a bank #7 as illustrated in FIG. 1, and function as a single cache as a whole.

For example, as for the nodes 130 located at the X coordinate of 0, the bank #0 contains a cache memory of the node 130 located at the coordinate (0, 7), the bank #1 contains a cache memory of the node 130 located at the coordinate (0, 6). Furthermore, the bank #2 contains a cache memory of the node 130 located at the coordinate (0, 5), and the bank #3 contains a cache memory of the node 130 located at the coordinate (0, 4).

Similarly, the bank #4 contains a cache memory of the node 130 located at the coordinate (0, 3), the bank #5 contains a cache memory of the node 130 located at the coordinate (0, 2).

Moreover, the bank #6 contains a cache memory of the node 130 located at the coordinate (0, 1), and the bank #7 contains a cache memory of the node 130 located at the coordinate (0, 0). The way to divide into the banks is the same between the main memory and the cache memory. Therefore, for example, the node 130 at the coordinate (0, 7) caches data stored in the main memory of the bank #0.

In addition, the cache memories of the nodes 130 located at the same Y coordinate function as a shared cache that manages assigned areas of a divided bank, and coherency (cache coherency) is maintained by snoop protocol. For example, the cache memories of the nodes 130 located at the coordinate (0, 0), the coordinate (1, 0), the coordinate (2, 0), the coordinate (3, 0), the coordinate (4, 0), the coordinate (5, 0), the coordinate (6, 0), and the coordinate (7, 0) function as a shared memory of the bank #7.

Functional Configuration of the Node 130

A configuration example of the node 130 will be explained below with reference to FIG. 2. FIG. 2 is a block diagram illustrating a configuration example of the node 130. As illustrated in FIG. 2, the node 130 includes four cores 201, a cache memory 202, and a torus router 300.

The cores 201 may include a dedicated cache hierarchy. The number of the cores of the node 130 is not limited to four as illustrated in FIG. 2. It is sufficient that the node 130 includes one or more cores. The following explanation is given on the assumption that information is transmitted and received between the cores by using a packet.

The cache memory 202 is, for example, a distributed shared cache memory, and is shared by a plurality of the nodes 130. The cache memories 202 of the nodes 130 arranged in an array at the same Y coordinate are managed as a single cache memory that is divided into banks in the Y-axis direction in units of at least a single node 130 or in units of at least a group of multiple nodes 130 located at the same Y coordinate. As for the cache memories 202 of the nodes 130 arranged in an array at the same X coordinate, the coherency of the cache memories in the X-axis direction is controlled by a snooping system.

The torus router 300 performs packet routing for the ring networks in the torus network according to the dimension of the coordinate system in which the nodes 130 are arranged. For example, the torus router 300 restricts data transfer due to cache sharing to the X-axis direction. Therefore, the torus router 300 transfers data between the shared caches by using the ring networks in the X-axis direction. The data transfer due to cache sharing includes transfer of control information on the snoop protocol.

Furthermore, for example, the torus router 300 restricts data transfer between the banks in the processor 100 to the Y-axis direction. Therefore, the torus router 300 transfers data between the banks by using the ring networks in the Y-axis direction. The detailed configuration of the torus router 300 will be explained below with reference to FIG. 3.

Functional Configuration of the Torus Router 300

Figure 3:
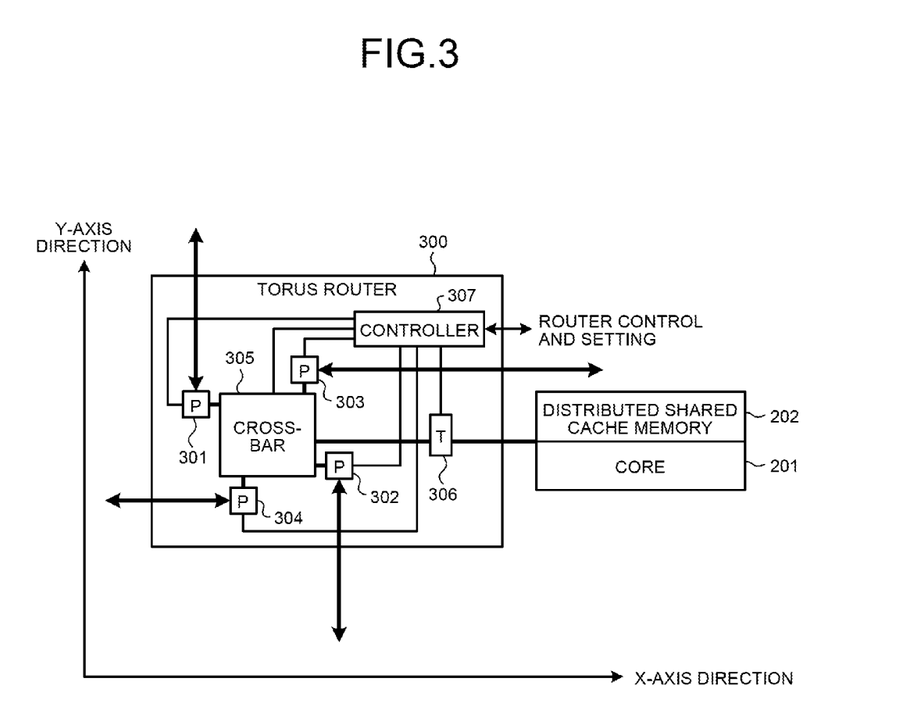
FIG. 3 is a diagram illustrating a configuration example of a torus router.

The configuration of the torus router 300 will be explained with reference to FIG. 3. FIG. 3 is a diagram illustrating a configuration example of the torus router 300. As illustrated in FIG. 3, the torus router 300 includes a port 301, a port 302, a port 303, and a port 304 (all of which are denoted by P in FIG. 3), and includes a crossbar 305, an interface 306 (T in FIG. 3), and a controller 307.

The port 301 and the port 302 receive a packet from the nodes 130 connected in the Y-axis direction. The port 301 and the port 302 transmit a packet to the nodes 130 connected in the Y-axis direction. Namely, the port 301 and the port 302 transfer data between the banks.

The port 303 and the port 304 receive a packet from the nodes 130 connected in the X-axis direction. The port 303 and the port 304 transmit a packet to the nodes 130 connected in the X-axis direction. Namely, the port 303 and the port 304 transfer data due to cache sharing.

The crossbar 305 is a transfer path for transmitting and receiving data to and from the ports 301 to 304. For example, the crossbar 305 outputs a packet input from the port 301 to the port 302. For another example, the crossbar 305 outputs a packet input from the port 303 to the port 304. For still another example, the crossbar 305 outputs a packet input from the port 301 to the port 304.

The interface 306 generates a packet for requesting acquisition of data according to an instruction issued by the core 201, and generates a packet to which data read from the cache memory 202 is added. The interface 306 extracts data from a packet received from the other nodes 130, and outputs the data to the core 201.

The controller 307 is connected to an externally-provided control processor (not illustrated), and receives settings, such as various conditions, as to routing. When, for example, a failure occurs in the controller 307, the controller 307 sends a notice of occurrence of the failure to the control processor.

Processing Operation

A processing operation performed by the processor 100 will be explained below with reference to FIG. 4 and FIG. 5. In the following, a processing operation performed when data is stored in another node located at the same X coordinate is explained with reference to FIG. 4, and a processing operation performed when data is stored in another node located at different X and Y coordinates is explained with reference to FIG. 5.

Figure 4:
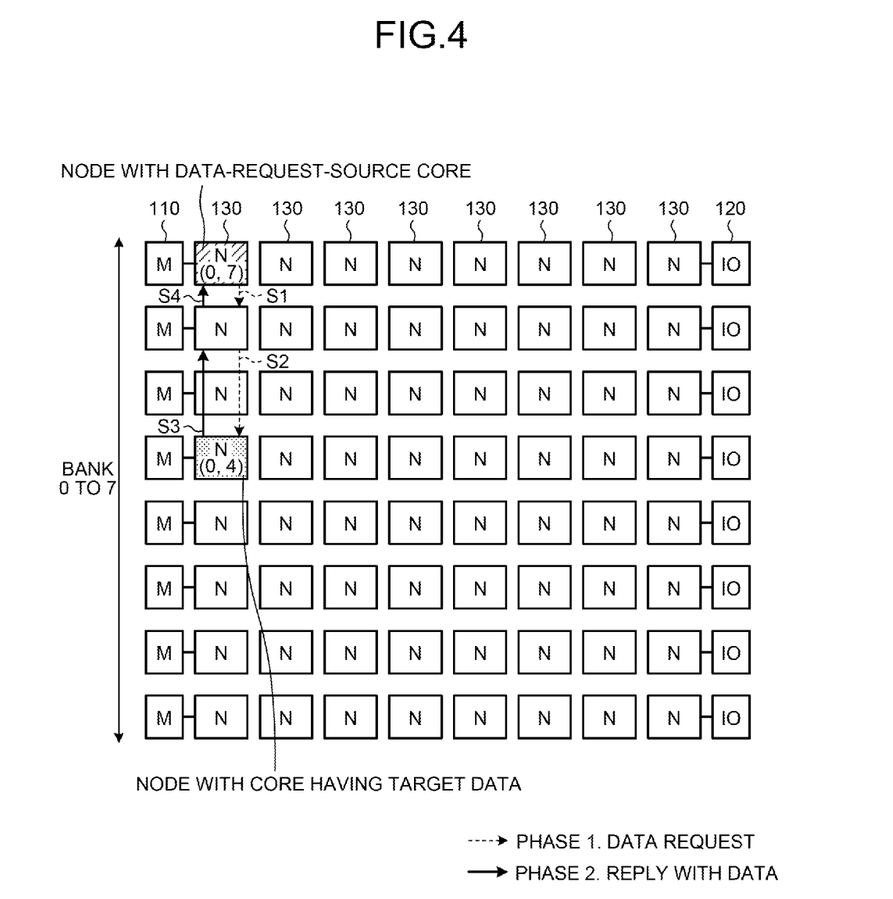
FIG. 4 is a diagram illustrating an example of a processing operation performed when data is stored in another node located at the same X coordinate.

FIG. 4 is a diagram illustrating an example of a processing operation performed when data is stored in another node located at the same X coordinate. In FIG. 4, an example is illustrated in which data requested by the node located at the coordinate (0, 7) is stored in the node located at the coordinate (0, 4).

As illustrated in FIG. 4, the node 130 located at the coordinate (0, 7) searches for a bank that stores therein the requested data based on an address of the requested data. Specifically, the node 130 located at the coordinate (0, 7) sends a data acquisition request in which the node 130 in the bank #3 is designated as a destination (Step S1).

The node 130 located at the coordinate (0, 6) receives the data acquisition request. In this case, because the destination is not the node 130 located at the coordinate (0, 6), this node 130 transfers the data acquisition request to the node 130 connected to this node 130 (Step S2).

Subsequently, the node 130 located at the coordinate (0, 4) receives the data acquisition request. In this case, because the destination is the node 130 located at the coordinate (0, 4), this node 130 checks whether this node 130 stores therein the requested data. The node 130 located at the coordinate (0, 4) sends a reply to the data acquisition request, together with the requested data, to the data request source (Step S3).

The node 130 located at the coordinate (0, 6) receives the reply from the node 130 located at the coordinate (0, 4). In this case, because the destination is not the node 130 located at the coordinate (0, 6), this node 130 transfers the reply to the node 130 connected to this node 130 (Step S4). Then, the node 130 located at the coordinate (0, 7) receives the reply and acquires the data.

Figure 5:
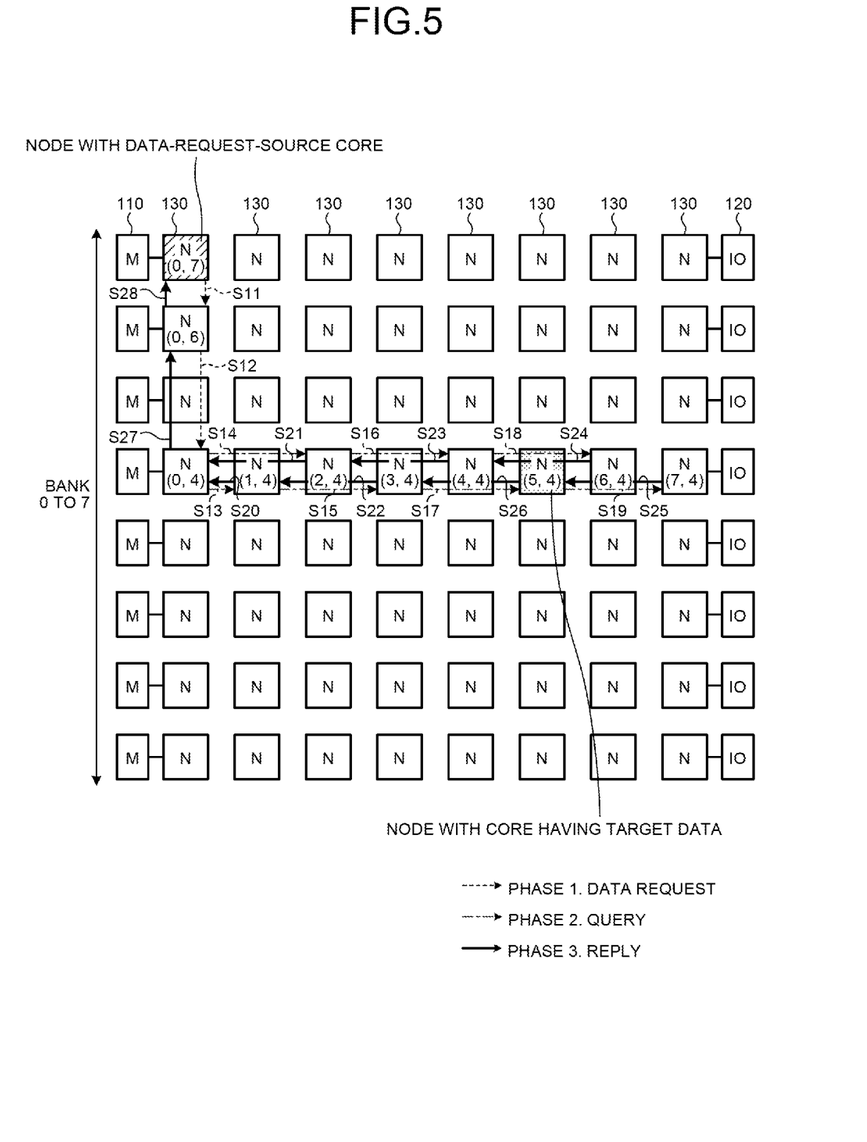
FIG. 5 is a diagram illustrating an example of a processing operation performed when data is stored in another node located at different X and Y coordinates.

FIG. 5 is a diagram illustrating an example of a processing operation performed when data is stored in another node located at different X and Y coordinates. In FIG. 5, an example is illustrated in which data requested by the node located at the coordinate (0, 7) is stored in the node located at the coordinate (5, 4).

As illustrated in FIG. 5, the node 130 located at the coordinate (0, 7) searches for a bank that stores therein the requested data based on an address of the requested data. Specifically, the node 130 located at the coordinate (0, 7) sends a data acquisition request in which the node 130 in the bank #3 is designated as a destination (Step S11).

The node 130 located at the coordinate (0, 6) receives the data acquisition request. In this case, because the destination is not the node located at the coordinate (0, 6), this node 130 transfers the data acquisition request to the node 130 connected to this node 130 (Step S12).

Subsequently, the node 130 located at the coordinate (0, 4) receives the data acquisition request. In this case, because the destination is the node 130 located at the coordinate (0, 4), this node 130 checks whether this node 130 stores therein the requested data.

At this time, the node 130 located at the coordinate (0, 4) determines that the requested data is not stored in the own device, and sends a query as to whether the requested data is stored in the other nodes to the other nodes at the same Y coordinate (Steps S13 to S19). For example, the node 130 located at the coordinate (0, 4) sends a query to the node 130 located at the coordinate (1, 4) and the node 130 located at the coordinate (2, 4) as to whether the requested data is stored in the nodes 130 (Step S13 and S14).

Similarly, the node 130 located at the coordinate (0, 4) sends a query to the nodes 130 located at the coordinate (3, 4) to the coordinate (7, 4) as to whether the requested data is stored in the nodes 130 (Steps S15 to S19).

The nodes 130 located at the coordinate (1, 4) to the coordinate (7, 4) sends a reply as to whether the requested data is stored in the nodes to the node 130 located at the coordinate (0, 4) (Steps S20 to S26).

For example, the node 130 located at the coordinate (1, 4) sends a reply indicating that the requested data is not stored in the own device to the node 130 located at the coordinate (0, 4) (Step S20). The node 130 located at the coordinate (2, 4) sends a reply indicating that the requested data is not stored in the own device to the node 130 located at the coordinate (0, 4) (Step S21).

Similarly, the nodes 130 located at the coordinate (3, 4), the coordinate (4, 4), the coordinate (6, 4), and the coordinate (7, 4) send a reply indicating that the requested data is not stored in these nodes 130 to the node 130 located at the coordinate (0, 4) (Steps S22 to S25).

The node 130 that is located at the coordinate (5, 4) and that has the requested data sends a reply indicating that the requested data is stored in the own device, together with the requested data, to the node 130 located at the coordinate (0, 4) (Step S26). The node 130 located at the coordinate (0, 4) sends a reply to the data acquisition request, together with the requested data, to the node 130 serving as the request source (Step S27).

The node 130 located at the coordinate (0, 6) receives the reply from the node 130 located at the coordinate (0, 4). In this case, because the destination is not the node 130 located at the coordinate (0, 6), this node 130 transfers the reply to the node 130 connected to this node 130 (Step S28). Then, the node 130 located at the coordinate (0, 7) receives the reply and acquires the data.

Flow of a Process Performed by the Node 130

The flow of a process performed by the node 130 will be explained below with reference to FIG. 6 and FIG. 7. In the following, the flow of a process performed by the node 130 for requesting acquisition of data will be explained with reference to FIG. 6, and the flow of a process performed by the node 130 that has received a packet requesting acquisition of data will be explained with reference to FIG. 7.

Process Performed by the Node 130 Serving as a Data Request Source

Figure 6:
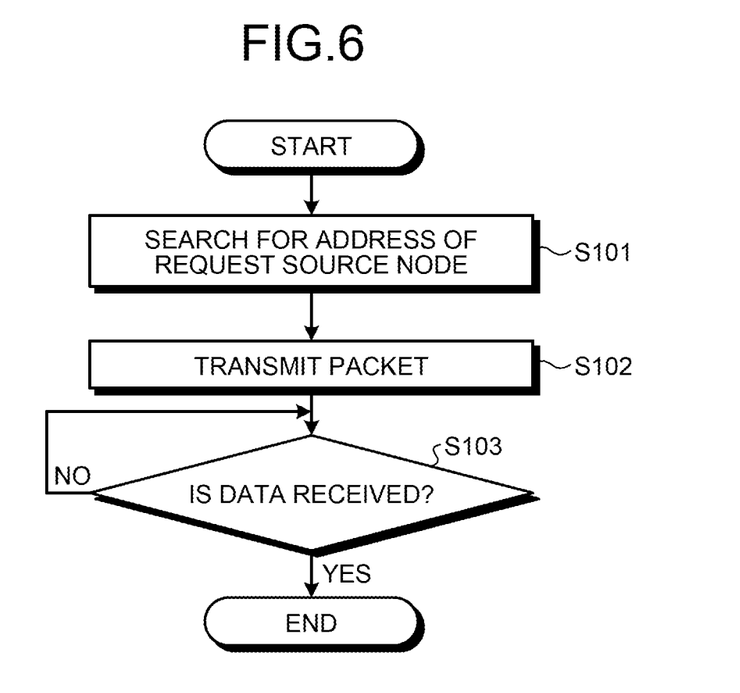
FIG. 6 is a flowchart of the flow of a process performed by a node that requests acquisition of data.

FIG. 6 is a flowchart of the flow of a process performed by the node 130 for requesting acquisition of data. As illustrated in FIG. 6, the node 130 that requests acquisition of data searches for an address of a node in which requested data is stored (Step S101). The node 130 transmits a packet requesting acquisition of data to a searched address serving as a destination (Step S102).

Subsequently, the node 130 determines whether the requested data is received (Step S103). When the node 130 determines that the requested data is received (YES at Step S103), the process is terminated. On the other hand, when the node 130 determines that the requested data is not received (NO at Step S103), the node 130 performs the process at S103 after a lapse of a predetermined time.

Figure 7:
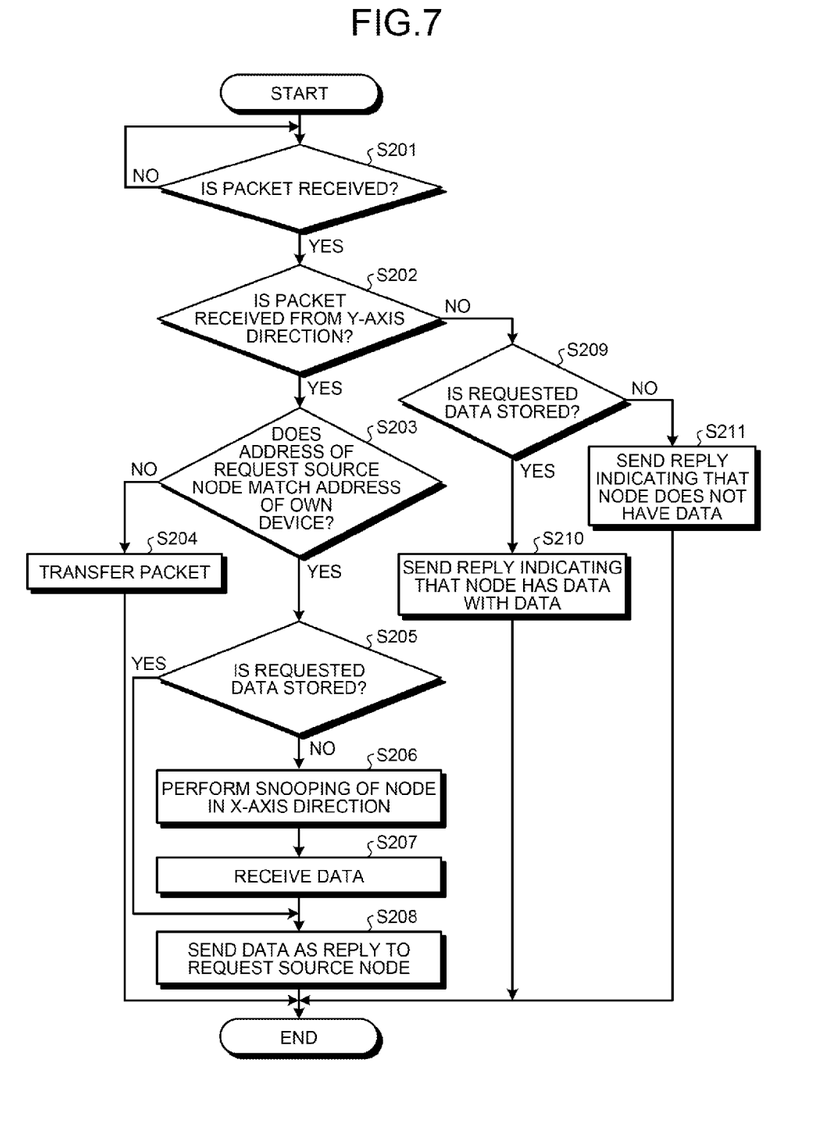
FIG. 7 is a flowchart of the flow of a process performed by a node that has received a packet requesting acquisition of data.

Process Performed by the Node 130 that has Received the Packet Requesting Acquisition of Data FIG. 7 is a flowchart of the flow of a process performed by the node 130 that has received the packet requesting acquisition of data. As illustrated in FIG. 7, the node 130 determines whether the packet requesting acquisition of data is received (Step S201). When determining that the packet requesting acquisition of data is received (YES at Step S201), the node 130 determines whether the packet is received from the Y-axis direction (Step S202).

When the node 130 determines that the packet is received from the Y-axis direction (YES at Step S202), the node 130 determines whether a destination address matches the address of the own device (Step S203). When the node 130 determines that the destination address does not match the address of the own device, (NO at Step S203), the node 130 transfers the received packet to another node connected thereto (Step S204).

On the other hand, when the node 130 determines that the destination address matches the address of the own device (YES at Step S203), the node 130 determines whether the requested data is stored in the cache memory of the own device (Step S205).

When the node 130 determines that the requested data is not stored in the cache memory of the own device (NO at Step S205), the node 130 broadcasts a query as to whether the requested data is stored in the other nodes 130 to the other nodes 130 located in the same X-axis direction (Step S206). Then, the node 130 receives the data from the node 130 that has the requested data (Step S207).

Subsequently, the node 130 sends the data as a reply to the node serving as a data request source (Step S208). When the node 130 determines that the requested data is stored in the cache memory of the own device at Step S205 (YES at Step S205), the node 130 sends the data as a reply to the node serving as a data request source (Step S208).

When the node 130 determines that the packet is not received from the Y-axis direction (NO at Step S202), in other words, when the node 130 determines that the node 130 has received the packet broadcasted from the X-axis direction, the node 130 performs processes as described below. Specifically, the node 130 determines whether the requested data is stored in the cache memory 202 of the own device (Step S209). When the node 130 determines that the node 130 has received the packet broadcasted from the X-axis direction, the node 130 determines whether the node 130 has the data, and also transfers a data acquisition packet to other subsequent nodes on the X axis. At this time, in the node 130, the torus router 300 transfers the data, so that the core and the cache memory are not involved in the transfer of the packet for requesting acquisition of data.

When the node 130 determines that the requested data is stored in the cache memory 202 of the own device (YES at Step S209), the node 130 sends a reply indicating that the node 130 has the data, together with the data, to the node 130 serving as a source of broadcasting (Step S210). On the other hand, when the node 130 determines that the requested data is not stored in the cache memory 202 of the own device (NO at Step S209), the node 130 sends a reply indicating that the node 130 does not have the data to the node 130 serving as the source of broadcasting (Step S211).

When the node 130 determines that the packet for requesting acquisition of data is not received at Step S201 (NO at Step S201), the node 130 performs the process at Step S201 after a lapse of a predetermined time.

Advantageous Effect of the First Embodiment

As described above, the processor 100 can improve the performance with an increase in the number of the cores.

For example, in the mesh network of the related technology, the bisection bandwidth is increased according to the network size. In this case, however, the value of the bisection bandwidth is only a half of the torus network. Furthermore, in the topology, such as a ring network, in which it is difficult to increase the bisection bandwidth according to the network size, layering is performed or the data bus width is widened. In this case, the data bus width for routing logic or each section in a chip is increased, so that the amount of change greatly increases. Therefore, it may be difficult to implement the increased data bus width. By contrast, in the processor 100, because ring connections are established in the X-axis direction and the Y-axis direction and the torus router 300 performs routing between the connections, the networks as a whole construct a torus network. In the torus network as described above, the bisection bandwidth increases with the increase in the number of cores. That is, the processor 100 can increase the bisection bandwidth with the increase in the number of cores without need to redesign the topology.

Furthermore, the processor 100 uses both of a shared cache and bank division. Therefore, the number of shared caches with respect to the number of cores "n" becomes a "square root of n" for each bank. Specifically, the number of controlled objects for cache coherency with respect to the number of cores can be reduced. For example, when there are sixty four caches, the number of controlled objects for the cache coherency is reduced to eight. Therefore, the processor 100 can reduce costs of controlling the cache coherency due to an increase in the number of cores.

Furthermore, the processor 100 employs, as a protocol for controlling the cache coherency, a snooping system that is simple and highly compatible with the ring network. Moreover, the snoop bus is interleaved due to the bank division and operates independently. Therefore, the bandwidth of the snoop bus is less likely to be a bottleneck. Furthermore, because the number of banks increases with an increase in the number of objects for which the cache coherency is ensured, the processor 100 can increase the bandwidth of the snoop bus. Therefore, in the processor 100, the snoop bus is less likely to be a bottleneck even when the size is expanded. Moreover, because the number of divided banks increases with an increase in the number of cores in the processor 100, it is possible to increase the throughput for accessing the cache memory with an increase in the number of cores.

Furthermore, the processor 100 can reduce load on protocol processing by using a snooping system as a control protocol for the cache coherency. Moreover, the processor 100 can simplify control of broadcast because the snoop bus is in the ring connection.

Furthermore, in the processor 100, a plurality of the nodes 130 are arranged in an array on the two-dimensional plane and connected in a ring shape in each of the X-axis direction and in the Y-axis direction; therefore, a link for connecting the nodes 130 can be shortened. Consequently, the processor 100 can mount high-bandwidth wiring.

Moreover, the processor 100 employs a simple snoop protocol and a simple ring network, so that it is possible to reduce the number of components used for the control, reduce electric power, and reduce time. Therefore, the processor 100 can mount a high-bandwidth data bus. Consequently, the processor 100 can increase the throughput.

Furthermore, the processor 100 divides the main memory into banks, similarly to the cache memory 202. The main memory is divided into the same banks as those of the cache memory 202 such that the banks correspond to the Y coordinates. Therefore, in the processor 100, transfer between the main memory and the cache memory 202 is closed within the X-axis and does not interfere with data transfer on the Y axis.

Moreover, a torus network may be used for a communication between the node 130 and the I/O control device 120 in the processor 100, similarly to the communication between the nodes 130. Therefore, in the processor 100, special wiring or a routing mechanism is not needed for a communication between the nodes 130 and a communication between the node 130 and the I/O control device 120.

[b] Second Embodiment

In some cases, a failure may occur in any of the nodes 130 of the processor 100. If a distributed shared cache memory is constructed between the nodes, it is difficult to separate the nodes from one another when a failure occurs. For example, it is difficult to physically isolate or replace a node in the chip, unlike replacement of a board or re-mounting of a chip.

In view of the above, the processor 100 may be configured to safely separate the node 130, in which a failure has occurred, to continue operation. Therefore, in a second embodiment, an example will be explained that the processor 100 disables the node 130 in which a failure has occurred. The configuration of an processor according to the second embodiment is the same as the configuration of the processor 100 illustrated in FIG. 1. Therefore, the same components are denoted by the same symbols as those in FIG. 1, and detailed explanation of the configuration of the processor according to the second embodiment will be omitted.

Processing Operation

Figure 8:
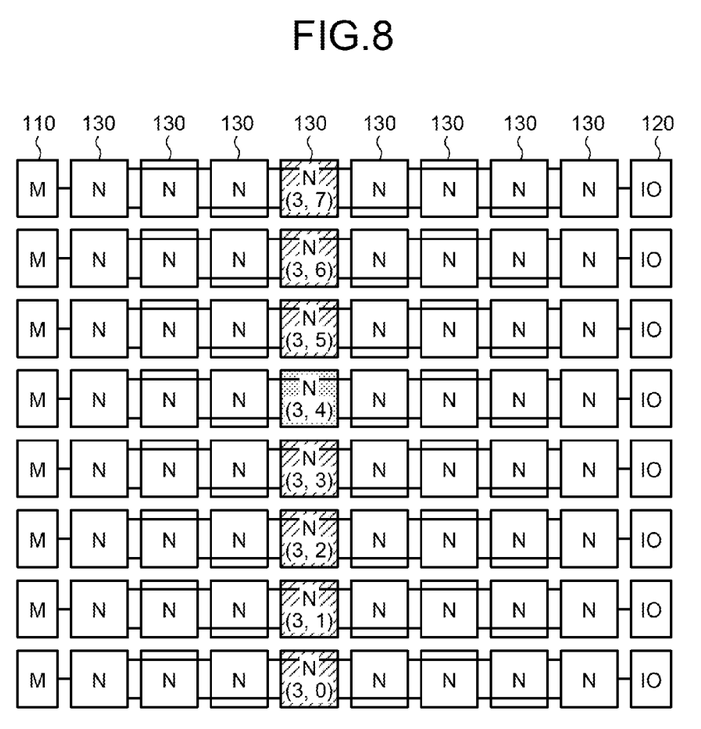
FIG. 8 is a diagram illustrating a processing operation performed when a failure occurs in a node located at the coordinate (3, 4)

With reference to FIG. 8, a processing operation that is performed when a failure occurs in the node 130 will be explained. In the following, as an example, a case is explained that a failure has occurred in the node 130 located at coordinate (3, 4). FIG. 8 is a diagram illustrating a processing operation that is performed when a failure occurs in the node 130 located at the coordinate (3, 4). In FIG. 8, the data bus in the Y-axis direction is omitted but the Y-axis direction is also connected by the data bus similarly to the configuration in FIG. 1.

When a failure occurs in the node 130 located at the coordinate (3, 4), the controller 307 of the torus router 300 of the node 130 in which the failure has occurred sends a notice of occurrence of the failure in the node 130 to a control processor. Furthermore, the controller 307 of the node 130 in which the failure has occurred disables the port 301 and the port 302 in the Y-axis direction.

The control processor instructs the controllers 307 of the nodes 130 located at the coordinate (3, 0), the coordinate (3, 1), the coordinate (3, 2), the coordinate (3, 3), the coordinate (3, 5), the coordinate (3, 6), and the coordinate (3, 7) to disable the port 301 and the port 302 in the Y-axis direction. Accordingly, the processor 100 disables the nodes 130 in a row at the X coordinate of 3. As a way to disable the nodes, in general, a job is finished while data being calculated is temporarily saved, a system is rebooted with a new setting (a node having a failure is separated), and the job is re-executed (from the save point). Alternatively, it may be possible to dynamically disable the node (without reboot). In this case, job re-assignment, cache flush, routing switching, or the like is performed dynamically.

As illustrated in FIG. 8, when all of the nodes 130 in the row at the same X coordinate of 3 are disabled, only the number of caches sharing data decreases. Even when all of the nodes 130 in the row at the same X coordinate are disabled, the disabled nodes 130 and the adjacent nodes 130 in the X-axis direction are connected to one another by one of two lines of the ring network, and therefore, it is possible to perform communication. Therefore, the processor 100 can continue operations. If all of the nodes 130 in the line at the same Y coordinate are disabled instead of the nodes 130 in the row at the same X coordinate, it becomes impossible for the processor 100 to use bank areas assigned to the disabled nodes 130 in the line at the same Y coordinate. Furthermore, if only the node 130 located at the coordinate (3, 4) is disabled, it becomes impossible for the processor 100 to use a specific bank in the node 130 at the X coordinate of 3.

As the level of a failure, there are a case in which "a failure occurs in only a core or a cache" and a case in which "a failure occurs in a router". When "a failure occurs in only a core or a cache", the router can continue operations. Therefore, the ring connection in the X-axis direction can be maintained.

When "a failure occurs in a router", a torus router of the node with the failure becomes disabled and the ring connection is disconnected. However, a single bus connection is maintained. In this case, because the optimal routing method differs between the single bus connection and the ring connection, the node is disabled and also routing logic is switched. For example, in FIG. 8, as a route for sending a reply from the node at the coordinate (5, 4) to the node at the coordinate (0, 4), there are two routes, one of which is "a route to send a packet in the negative direction in the X coordinate" and "a route to send a packet in the positive direction in the X coordinate". "The route to send a packet in the negative direction in the X coordinate" is a route for sending a packet in order of the coordinate (5, 4), the coordinate (3, 4), the coordinate (1, 4), and the coordinate (0, 4). "The route to send a packet in the positive direction in the X coordinate" is a route for sending a packet in order of the coordinate (5, 4), the coordinate (6, 4), the coordinate (4, 4), the coordinate (2, 4), and the coordinate (0, 4). If all of the nodes are in the normal state, the node at the coordinate (5, 4) uses "the route to send a packet in the negative direction in the X coordinate" that is the shortest route. On the other hand, when a failure occurs in the node at the coordinate (3, 4) involving the router, the node at the coordinate (5, 4) uses "the route to send a packet in the positive direction in the X coordinate". In this way, when a failure occurs in the router, the torus router of the node with the failure becomes disabled and the ring connection is disconnected while the single bus connection is maintained in the processor 100. Therefore, in the processor 100, no node is isolated from other nodes.

Figure 9:
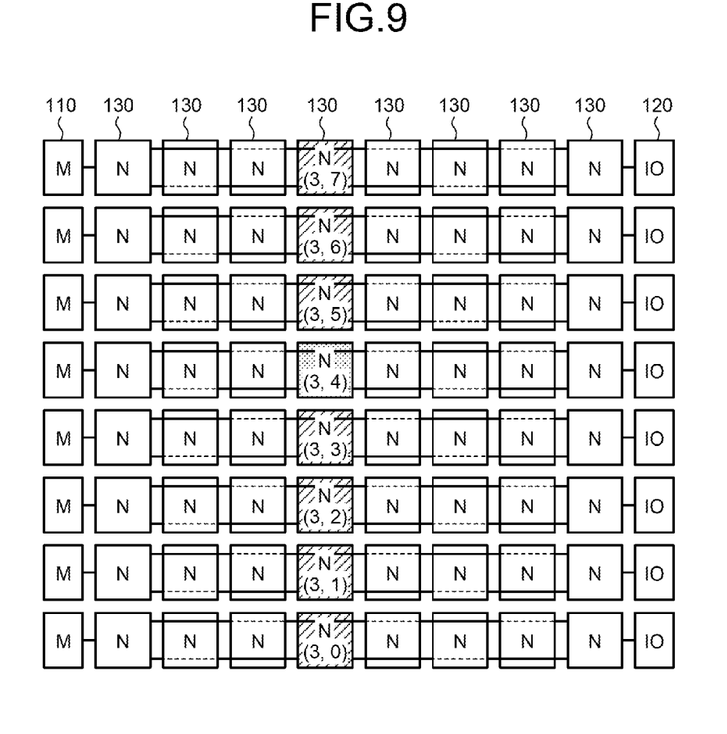
FIG. 9 is a diagram illustrating an example of bypass by a physical layer.

To maintain the ring connection even when a failure occurs in a router, it is preferable to separately provide a bypass route or enable bypass by a physical layer. An example of bypass by the physical layer will be explained below with reference to FIG. 9. FIG. 9 is a diagram illustrating an example of bypass by the physical layer.

Wiring indicated by dashed lines in FIG. 9 indicate routes through which bypass is possible without via the torus router 300. In this way, if the bypass route in the physical layer is used when a failure occurs in the torus router 300, the processor 100 can maintain the ring connection.

[c] Third Embodiment

The present invention may be embodied in various different forms other than the embodiments described above. In a third embodiment, other embodiments of the present invention will be explained.

System Configuration

Of the processes described in the embodiments, all or part of a process described as being performed automatically can also be performed manually. Alternatively, all or part of a process described as being performed manually can also be performed automatically by known methods. In addition, the processing procedures, control procedures, specific names, and information including various types of data and parameters illustrated in the above-described document and drawings can be arbitrarily changed unless otherwise specified.

Figure 2:
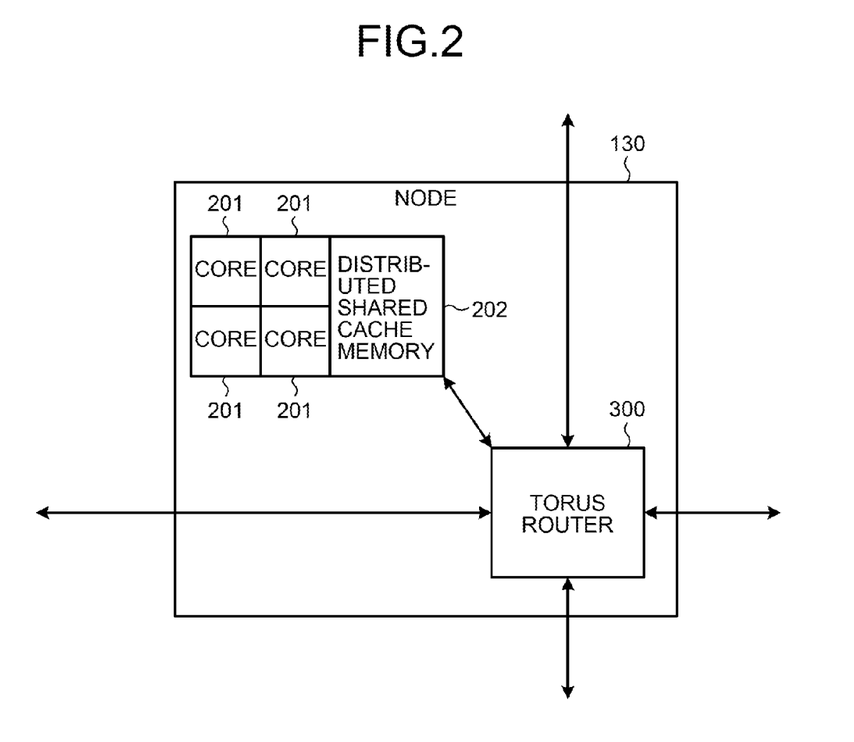
FIG. 2 is a block diagram illustrating a configuration example of a node.
Figure 10:
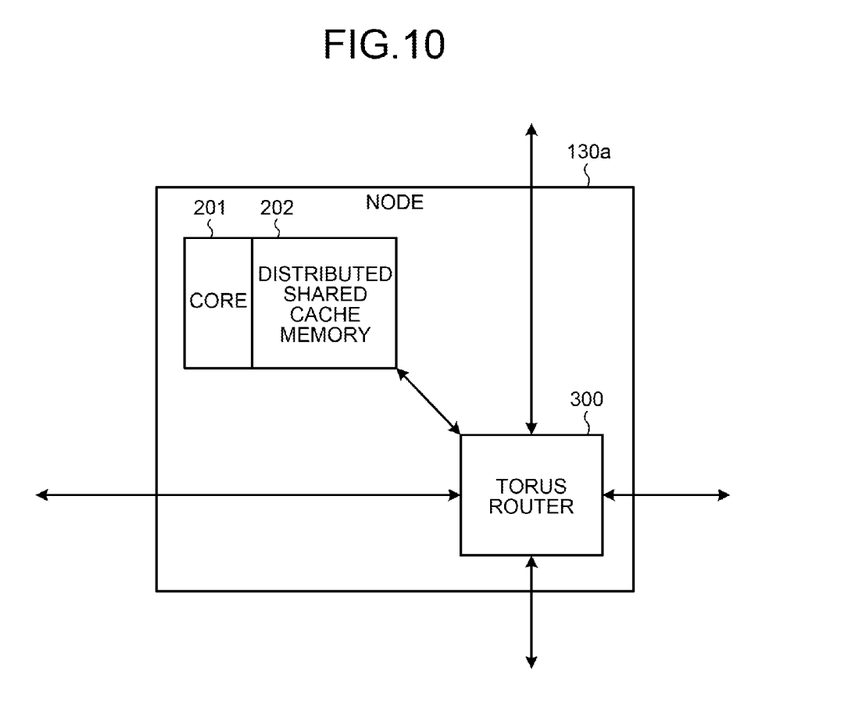
FIG. 10 is a block diagram illustrating a configuration example of a node with one core per node.

Furthermore, the number of cores included in the node 130 is not limited to four as illustrated in FIG. 2. For example, as illustrated in FIG. 10, a node 130*a* includes the single core 201, the distributed shared cache memory 202, and the torus router 300. If the processor 100 illustrated in FIG. 1 includes the node 130*a*, the number of cores becomes sixty four. FIG. 10 is a block diagram illustrating a configuration example of a node with one core per node.

The components illustrated in the drawings are functionally conceptual and do not necessarily have to be physically configured in the manner illustrated in the drawings. Furthermore, for each processing function performed by each apparatus, all or any part of the processing function can be implemented by a CPU and a program analyzed and executed by the CPU or can be implemented as hardware by wired logic.

According to one embodiment of the present invention, it is possible to improve performance of a processor with an increase in the number of cores.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processor in which a plurality of nodes, each including a processor core and a distributed shared cache memory, are arranged two-dimensionally in an X-axis direction and a Y-axis direction, the processor comprising:

a first connecting unit that connects a node located at a position other than both ends in the X-axis direction and a node located adjacent to the node located at the position other than both ends in the X-axis direction, and connects a node located at the either end in the X-axis direction and a node adjacent to the node located at the either end in the X-axis direction; and a second connecting unit that connects a node located at a position other than both ends in the Y-axis direction and a node located adjacent to the node located at the position other than both ends in the Y-axis direction, and connects a node located at the either end in the Y-axis direction and a node adjacent to the node located at the either end in the Y-axis direction, wherein the cache memories included in the respective nodes are divided into banks in the Y-axis direction, coherency of the cache memories in the X-axis direction is controlled by a snoop system, and the cache memories are shared by the nodes.

2. The processor according to claim 1, wherein when a failure occurs in a node, the node with the failure and nodes located at the same X coordinate with the node with the failure are separated from the processor.

3. A control method for a processor in which a plurality of nodes, each including a processor core and a distributed shared cache memory, are arranged two-dimensionally in an X-axis direction and a Y-axis direction, the control method for the processor comprising:

issuing, by each of the nodes, a request to acquire data stored in a cache memory of a different node to a bank that stores the data, the bank being a division of each of the cache memories of the nodes in the Y-axis direction, with designation of an address of the bank via nodes that are connected to one another in the Y-axis direction by a second connecting unit of the processor;

sending, by the subject node, the data from a subject node that manages the bank with the designated address and that is located at a same X coordinate as the node that has issued the request to the node that has issued the request via the nodes that are connected to one another in the Y-axis direction, when the data is stored in the subject node; and causing, by the subject node, the subject node to send a query about a node that has the data from the subject node to nodes that are connected to one another in the X-axis direction by a first connecting unit of the processor, to thereby acquire the data, and causing the subject node to send the acquired data to the node that has issued the request via the nodes that are connected to one another in the Y-axis direction, when the data is not stored in the subject node, wherein the first connecting unit connects a node located at a position other than both ends in the X-axis direction and a node located adjacent to the node located at the position other than both ends in the X-axis direction, connects a node located at the either end in the X-axis direction and a node adjacent to the node located at the either end in the X-axis direction, and the second connecting unit connects a node located at a position other than both ends in the Y-axis direction and a node adjacent to the node located at the position other than both ends in the Y-axis direction, connects a node located at the either end in the Y-axis direction and a node adjacent to the node located at the either end in the Y-axis direction.

4. The method according to claim 3, wherein when a failure occurs in a node, the node with the failure and nodes located at the same X coordinate with the node with the failure are separated from the processor.

* * * * *